United States Patent
Roger et al.

(10) Patent No.: US 7,384,885 B2
(45) Date of Patent: Jun. 10, 2008

(54) CATALYST ACTIVATION AND RESINS THEREFROM

(75) Inventors: Scott T. Roger, Houston, TX (US); Thomas W. Towles, Baton Rouge, LA (US); Anthony N. Speca, Kingwood, TX (US); Stanley J. Katzen, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 18 days.

(21) Appl. No.: 11/058,814

(22) Filed: Feb. 16, 2005

(65) Prior Publication Data

US 2005/0192177 A1    Sep. 1, 2005

(51) Int. Cl.
*C08F 4/24* (2006.01)
*C08F 4/02* (2006.01)

(52) U.S. Cl. ............... 502/113; 502/309; 526/107; 526/108; 526/113

(58) Field of Classification Search ........... 502/113, 502/309; 526/113
See application file for complete search history.

(56) References Cited

U.S. PATENT DOCUMENTS

| 3,780,011 A | 12/1973 | Pullukat et al. |
|---|---|---|
| 3,887,494 A | 6/1975 | Dietz |
| 3,976,632 A | 8/1976 | Delap |
| 3,996,163 A | 12/1976 | Crump et al. |
| 4,016,343 A | 4/1977 | Hoff et al. |
| 4,184,979 A | 1/1980 | Kirch et al. |
| 4,312,967 A | 1/1982 | Norwood et al. |
| 4,368,303 A | 1/1983 | McDaniel |
| 4,384,987 A | 5/1983 | Hawley |
| 4,402,864 A | 9/1983 | McDaniel |
| 4,728,703 A * | 3/1988 | Konrad et al. ............... 526/105 |
| 4,877,763 A | 10/1989 | McDaniel et al. |
| 4,996,384 A | 2/1991 | Pelrine et al. |
| 5,096,868 A | 3/1992 | Hsieh et al. |
| 5,573,993 A | 11/1996 | Koch |
| 6,174,981 B1 | 1/2001 | Bergmeister et al. |
| 6,359,085 B1 | 3/2002 | Lhost et al. |
| 6,921,798 B2 | 7/2005 | Kendrick et al. |
| 2003/0232715 A1 | 12/2003 | Katzen et al. |
| 2004/0192863 A1 * | 9/2004 | Towles ...................... 523/113 |
| 2004/0192864 A1 * | 9/2004 | Towles ...................... 526/113 |
| 2005/0119426 A1 * | 6/2005 | Roger et al. ................. 526/113 |
| 2006/0089468 A1 | 4/2006 | Katzen et al. |

FOREIGN PATENT DOCUMENTS

| DE | 2622755 | 8/1977 |
|---|---|---|
| EP | 0 279 890 | 8/1988 |
| EP | 0 314 385 | 5/1989 |
| EP | 0 882 740 | 12/1998 |
| EP | 1 172 381 | 1/2002 |
| WO | 01/32307 | 5/2001 |
| WO | 2005/052012 | 6/2005 |

* cited by examiner

*Primary Examiner*—Caixia Lu
(74) *Attorney, Agent, or Firm*—Amy C. Trexler; Frank E. Reid; Kevin M. Faulkner

(57) ABSTRACT

The present invention relates to the removal of hydrocarbon residues from a catalyst and more specifically the air activation of a catalyst containing hydrocarbon residues. It also relates to extruded pipe and utility conduit resins comprising polyethylene, household/industrial chemicals container resins, and to a polyethylene resin particularly suitable for large parts by blow molding and sheet extrusion procedures, wherein the resin is made by a process using an activated chromium and titanium-based catalyst.

30 Claims, No Drawings

CATALYST ACTIVATION AND RESINS THEREFROM

CROSS-REFERENCE TO RELATED APPLICATIONS

The present application claims the benefit of International Application Nos. PCT/US03/34679 filed Oct. 31, 2003, and PCT/US03/09869, PCT/US03/09870, and PCT/US03/09871 all filed Mar. 31, 2003, said applications being incorporated herein by reference.

FIELD OF THE INVENTION

The present invention relates to the removal of hydrocarbon residues from a catalyst and more specifically the activation of a catalyst containing hydrocarbon residues. This invention is also related to high performance extruded pipe resins, utility conduit resins, household/industrial chemical "HIC" container resins, and a method of producing a high molecular weight HDPE particularly suitable for blow molding and sheet extrusion applications, such as manufacture of large parts.

BACKGROUND

Components of a catalyst are often supplied to a support by contacting the support with a solution containing the component, such as for instance contacting a silica support with a solution of chromium acetate in hexane. See, for example, U.S. Pat. No. 5,895,770.

It is well known in the art to activate a supported catalyst comprising chromium, useful in the manufacture of polyolefins such as polyethylene, by a treatment comprising calcining the supported catalyst in the presence of an excess of molecular oxygen at a temperature in the range of about 300° C. to about 1000° C. for up to about 50 hours. See, for example, U.S. Pat. No. 4,981,831.

U.S. Pat. No. 5,093,300 discloses that after treatment in an oxidizing atmosphere up to about 850° C. a chromium catalyst is cooled down and then treated in a non-oxidizing atmosphere.

U.S. Pat. No. 6,150,572 discloses regenerating a chromium catalyst containing organic contaminants by treatment with an oxidizing gas such as air at temperatures of from 350° C. to 400° C. until the organic contaminants disappear, followed by treatment with hydrogen mixed with an inert gas.

U.S. Pat. No. 6,201,077 B1 discloses a chromium on silica catalyst activated in an oxidizing ambient at from 600-1100° F. (about 315° C. to about 590° C.) useful in producing a polyethylene having high Environmental Stress Crack Resistance ("ESCR") for blow molding applications. The activation treatment period is from 1 minute to 50 hours. The most preferred activation temperature is from about 900° F. to about 1050° F. (about 480° C. to about 565° C.). U.S. Pat. No. 6,204,346 and U.S. Patent Application Nos. 2001/0004663 and 2001/0007894 disclose similar procedures.

U.S. Pat. No. 6,214,947 discloses treating a chromium catalyst in a dry inert gas, then titanating the catalyst, and then activating with oxygen.

U.S. Pat. No. 6,359,085 (see also the related EP 1038 886 A1) discloses a thermal treatment for a chromium-based catalyst comprising treatment under $N_2$ at 350-850° C. and then treatment under air at 350-850° C. The treatment with both nitrogen and air preferably occurs at or above 480° C., but according to the disclosure the treatment in nitrogen and air must not be carried out at the same temperature and it is preferred that the treatment in air occur at a temperature lower than the treatment under $N_2$. After the treatment with air, the chromium based catalyst is cooled down to room temperature while replacing the air with nitrogen before contact with ethylene in a polymerization process.

EP 0 882 740 A1 and EP 0 882 743 A1 disclose a supported chromium-based catalyst titanated under specific conditions and used for the homopolymerization or copolymerization of ethylene. After drying in an inert gas at a temperature of at least 300° C., the catalyst is titanated and then activated at a temperature of at least 500° C.

The present inventors have observed that catalysts comprising a support such as silica which is coated with chromium, titanium, and optionally at least one of zirconium, aluminum, and boron, and containing organic residues from the coating process, produce a "heat kick" or temperature spike or exotherm during normal air activation, such as by heated fluidization. While not wishing to be bound by theory, this heat kick is believed to be the result of uncontrolled oxidation of the organic groups. The present inventors have discovered that controlling the temperature spike in the appropriate manner improves the catalyst performance, as hereinafter described.

Embodiments of the present invention may have the advantage over previously known methods of activating supported chromium/titanium catalysts in having one or more of the following: an improved catalyst activity, improved melt index ("MI") response, an improved ESCR in a polyethylene manufactured using the catalyst prepared according to the present invention, or a combination of these improvements. The catalyst prepared according to the invention may be used to produce polyolefins by solution polymerization, slurry polymerization, and gas-phase polymerization techniques.

Large diameter plastic pipe such as highway drainage pipe is typically made in a continuous extrusion process comprising extruding resin through a die to provide a large diameter tube capable of carrying a fluid. One typical use is as highway and/or storm water drainage pipe. The term "pipe extrusion resin" in the art is used to distinguish this type of hollow tube from conduit resin designed to carry utilities such as wire, cable, and the like. These different uses have different requirements.

The emphasis in the extruded pipe market is for a resin that exhibits high ESCR, that may be easily extruded through a relatively large diameter die, and that also has the appropriate strength characteristics to maintain its integrity during use, e.g., as buried drainage pipe.

High molecular weight, high density polyethylene (HMW HDPE) is used to manufacture storage containers, such as large industrial drums (e.g., 30- and 55-gallons) and intermediate bulk containers ("IBC") such as 100- and 300-gallon containers. HMW HDPE is also used in sheet extrusion/thermoforming operations to produce large parts such as truck bed liners, "port-a-potties" or portable toilets, and "dunnage trays" for holding and transporting large industrial parts such as transmissions. The end user expects—and governmental regulations often require—that the container meet certain minimum requirements, such as for impact resistance, top load, ESCR, and chemical resistance. In addition, the manufacturer of the containers expect ease of processability. Depending on the end use, there may be even more specific requirements of the material. For instance, in the case of large drums manufactured by blow molding, a high melt strength is generally desired, as the parison produced in the blow molding process typically must maintain its integrity for longer periods of time as the object made gets larger.

High molecular weight HDPE is also used to manufacture HIC containers, and once again, the end user expects certain minimum requirements will be met, as given above.

In the development of resin there is typically a trade off between characteristics such as resistance to slow crack growth and rupture (measured, for instance, by ESCR), stiffness (measured, for instance, by density) and processability or more specifically ease of extrusion (measured, for instance, by MI). Typically the higher the molecular weight of polyethylene, the higher the resistance to crack growth. However, increasing the molecular weight will decrease processability and make extrusion more difficult.

Conduit resin comprising polyethylene resin is typically used in a continuous extrusion process comprising extruding the resin through a die to provide a hollow pipe or conduit which can carry utilities such as wire, cable, fiber optics, and the like. The electrical conduit market alone uses over 300 million pounds of HDPE annually. The term "conduit" in the art is used to distinguish this type of hollow tube from large diameter pipe, such as highway drainage pipe. These different uses have radically different requirements. The emphasis in the conduit market is for a resin that exhibits high ESCR and that may be easily extruded through a relatively small diameter die.

The manufacturers of the conduit typically have an investment in having their extrusion apparatus set to accept a resin having a certain processability range and the challenge for the resin manufacturer is to provide the target processing characteristics while at the same time optimizing end use characteristics as much as possible. The problem is then to supply the appropriate resin with consistent quality and acceptable price.

U.S. Pat. No. 6,403,181 B1 relates to a premium performance polyethylene produced using a metallocene transition metal catalyst, providing a high molecular weight component and a low molecular weight component.

A number of patents are directed to producing HDPE having good resistance to stress cracking, for instance U.S. Pat. No. 6,214,947, WO 00/14129, and EP 0905148. Typically such patents are directed to the catalyst systems employed in the production of the HDPE and more specifically to complicated preparation and/or treatment techniques such catalysts to optimize activity and catalyst life, among other characteristics.

However, what is needed is a process for producing a resin targeted for the pipe extrusion and utility conduit markets, wherein the process uses a readily available catalyst, for instance a commercial catalyst, that may be easily and reproducibility activated and wherein the resultant activated catalyst has high activity and long life.

The present inventors have discovered a method of making pipe extrusion and utility conduit resins having a high ESCR and good processability using a chromium and titanium-based supported catalyst which is commercially available and which may be readily activated for polymerization so as to provide for an excellent MI response, high activity, and long catalyst life.

Embodiments of the present invention may have the advantage over previously known methods of producing conduit HDPE by having improved MI and an improved ESCR.

Chromium catalysts are well known catalysts for olefin polymerization and are useful in preparing HMW HDPE. In these catalysts, a chromium compound, such as chromium oxide, is supported on a support of one or more inorganic oxides such as silica, alumina, zirconia or thoria, and activated by heating in a non-reducing atmosphere. U.S. Pat. No. 2,825,721 describes chromium catalysts and methods of making the catalysts. It is also known to increase polymer melt index by using a silica-titania support as disclosed, for example, in U.S. Pat. No. 3,887,494. Numerous activation procedures have been described in the prior art for optimizing catalyst performance and resultant ethylene polymer characteristics, such as U.S. Pat. Nos. 4,981,831; 5,093,300; 5,895,770; 6,150,572; 6,201,077; 6,204,346; 6,214,947; 6,359,085; and 6,569,960; U.S. Patent Application Nos. 2001/0004663 and 2001/0007894; EP 1038 886 A1; EP 0 882 740 A1; EP 0 882 743 A1; EP 0905148; and WO 00/14129.

What is needed is a resin in particular having a high ESCR, good stiffness, and excellent processing characteristics, produced by a process that preferably can employ a commercially available catalyst, and wherein the activated catalyst has high activity and long life.

The present inventors have discovered a method of making a resin particularly suitable for utility conduit; extruded pipe; household/industrial containers; and large part blow molding applications, particularly drums, IBCs, and sheet extrusion parts, having high ESCR, high impact resistance, high stiffness, and good processability, using a chromium and titanium-based supported catalyst activated in a simple manner so as to provide for high activity, and long catalyst life, said catalyst being commercially available.

Embodiments of the present invention may have the advantage over previously known methods of producing blow molding HDPE by having an improved ESCR versus density relationship, yet maintaining good processing and stiffness characteristics.

SUMMARY OF THE INVENTION

The present invention relates to an activation procedure for a supported catalyst comprising chromium and titanium which utilizes nitrogen or other inert gas in the early stages of the activation, followed by controlled addition of an oxidant, such as oxygen gas, preferably air, to complete the activation of the catalyst.

In one embodiment, the present invention includes treatment of a chromium and titanium-based supported catalyst in an activator at about 370-540° C. (700-1000° F.), preferably 370-450° C. (700-850° F.), more preferably 370-425° C. (700-800° F.), still more preferably 370 to 400° C. (700-750° F.), under an inert atmosphere, followed by the introduction of oxygen gas and controlling the activator and catalyst temperature so that the temperature of the catalyst activator does not exceed 510° C. (950° F.), preferably no higher than about 480° C. (900° F.), and yet still more preferably no higher than about 450° C. (850° F.), most preferably no higher than about 425° C. (800° F.).

Activation may then be completed by contacting the catalyst in the activator with an oxidizing atmosphere, preferably an atmosphere consisting essentially of air. It is preferred that the final temperature of the activator under an atmosphere consisting essentially of air be at least about 425° C. (800° F.), more preferably about 540° C. (1000° F.), and still more preferably 590° C. (1100° F.) up to about 870° C. (1600° F.).

Yet another embodiment includes the supported chromium and titanium-containing catalyst produced by the process according to the present invention, which is useful in the manufacture of polyolefins having improvements in one or more of the following properties: activity, MI response, and ESCR.

These and other embodiment, features, and advantages of the present invention will become apparent as reference is made below to a detailed description of additional embodiments, including specific examples.

It is an object of this invention to provide a process to polymerize ethylene, or ethylene and at least one other olefin to produce a polymer particularly suitable for the pipe extrusion and electrical conduit markets.

It is also an object of this invention to provide said polymer in an efficient manner using a catalyst activated for polymerization so as to provide for an excellent MI response, high activity, and long catalyst life.

It is still a further object of this invention to provide large diameter extrusion pipe and electrical conduit from the polyethylene produced according to the present invention.

Yet still further an object of the invention is to provide an activated catalyst for the manufacture of pipe extrusion and utility conduit resins.

It is an object of this invention to provide a process to polymerize ethylene, or ethylene and at least one other olefin, particularly an alpha olefin, and even more particularly an alpha olefin comprising 3 to 10 carbon atoms, to produce a polymer particularly suitable for the large part molding market, (e.g., blow molding, sheet extrusion especially in the production of containers such as 30- and 55-gallon drums and IBCs and HIC containers.

It is also an object of this invention to provide said polymer in an efficient manner using a catalyst activated for polymerization so as to provide for a higher ESCR versus density performance, high activity, and long catalyst life.

It is still a further object of this invention to provide articles such as large industrial containers, particularly 30- and 55-gallon drums, IBCs, and sheet extrusion parts, and HIC containers from the resin produced according to the present invention.

Yet still further an object of the invention is to provide an activated catalyst for the manufacture of blow molding resin.

In certain embodiments, the invention provides polyethylene resins produced by the inventive process, and articles formed of such resins. Typical articles include, for example, containers for the shipping of large industrial parts, and industrial bulk containers such as drums (e.g., 30- and 55-gallon drums), and the like, and 100-, 300-, and 400-gallon IBCs, and the like.

These and other objects, features and advantages of the present invention will become apparent as reference is made to the following detailed description, additional embodiments, specific examples, and appended claims.

DETAILED DESCRIPTION

The extruded pipe, utility conduit, blow molding, and sheet extrusion resins according to the invention can be polymerized using any known process in the art for producing polyethylene, especially HDPE, such as gas phase, solution, or slurry polymerization conditions. A stirred reactor can be utilized for a batch or continuous process, or the reaction can be carried out continuously in a loop reactor.

In an embodiment, the polymerization occurs in a slurry loop reactor under slurry polymerization conditions. One of ordinary skill in the art, in possession of the present disclosure, can determine the appropriate slurry polymerization conditions. Loop reactors are known in the art, see, for example, U.S. Pat. Nos. 3,248,179; 4,424,341; 4,501,855; 4,613,484; 4,589,957; 4,737,280; 5,597,892; and 5,575,979.

In a more preferred embodiment, the polymerization technique is slurry loop reactor, particularly those described in published U.S. Pat. Nos. 6,319,997; 6,204,344; 6,281,300; and 6,380,325.

Typically slurry loop polymerization is conducted at temperature conditions in the range of from about 88-110° C. (190-230° F.). However, using a catalyst according to the present invention, extrusion pipe resin fouling conditions occur at temperatures above about 102° C. (215° F.). It is preferred that polymerization occur between about 99-102° C. (210-215° F.).

Typical slurry loop polymerization is conducted at pressures in the range of about 400 psia to about 800 psia. Again, using a catalyst according to the present invention within the preferred temperature range, pressures of about 500-600 psig (515-615 psia) are preferred.

The sheet extrusion and blow molding resin of the invention is preferably produced in a slurry reactor, such as a stirred slurry reactor or a slurry loop reactor. For illustrative purposes, the methods are described below with particular reference to a slurry loop reactor. However, it should be appreciated that the methods are not limited to this particular polymerization reactor configuration.

A slurry loop olefin polymerization reactor can generally be described as a loop-shaped continuous pipe. One or more fluid circulating devices, such as an axial flow pump, circulate the reactor contents within the pipe in a desired direction so as to create a circulating current or flow of the reactor contents within the pipe. Desirably, the fluid circulating devices are designed to provide high velocity. The loop reactor may be totally or partially jacketed with cooling water in order to remove heat generated by polymerization.

In the slurry loop olefin polymerization reactor, the polymerization medium includes monomer, optional comonomer, minor quantities of other additives as known in the art, and a hydrocarbon carrier or diluent, advantageously aliphatic paraffin such as propane, butane, isobutane, isopentane, or mixtures thereof. Actual temperature and pressure conditions will depend on various parameters such as the carrier or diluent, as would be known by one of ordinary skill in the art. Additional description is given in numerous patents, including U.S. Pat. Nos. 5,274,056 and 4,182,810 and PCT publication WO 94/21962.

The slurry loop olefin polymerization reactor may be operated in a single stage process or in multistage processes. In multistage processing, the polymerization of olefins is carried out in two or more polymerization reactors. These polymerization reactors can be configured in series, in parallel, or a combination thereof. U.S. Pat. No. 6,380,325 sets forth a two stage flash process which is a preferred platform to practice the present invention.

The resin according to the present invention may be produced using the catalyst treated according to the processes described above by slurry loop polymerization conducted at temperature conditions in the range of about 88-110° C. (190-230° F.). It is preferred that polymerization occur between about 93-109° C. (200-228° F.) and pressures of about 500-650 psig (515-665 psia). The preferred diluent in a process according to the present invention is isobutane.

In an embodiment of the invention, a blow molding, sheet extrusion, or HIC container resin is produced preferably having a density of about 0.940-0.960 g/cm$^3$, more preferably 0.950-0.957 g/cm$^3$ (ASTM D-1505) and a preferred range of $I_{22}$ of about 2-12 g/10 min, more preferably 3-8 g/10 min (ASTM D-1238-65T, Condition F). These characteristics may be readily achieved by one of ordinary skill in the art in possession of the present disclosure. Typically HMW HDPE will have a molecular weight range from about 100,000 g/mole to about 4,000,000 g/mole. HDPE is typically defined as having a density above about 0.940 g/cm$^3$.

Numerous diluents are known to be useful in the slurry loop process. The preferred diluent in a process according to the present invention is isobutane.

The catalyst treated by the process according to the present invention comprises chromium and titanium on a support. In order to achieve the maximum advantages provided by the present invention, the supported catalyst further comprises hydrocarbon residues, as described more fully below. In one embodiment the catalyst is supported on silica. In another embodiment a silica/alumina support is used.

In an embodiment, the support is a silica-titania support. Silica-titania supports are well known in the art and are described, for example, in U.S. Pat. No. 3,887,494. Silica-titania supports can be produced as described in U.S. Pat. No. 3,887,494, 5,096,868 or 6,174,981 by "cogelling" or coprecipitating silica and a titanium compound. Such a cogel can be produced by contacting an alkali metal silicate such as sodium silicate with an acid such as sulfuric acid, hydrochloric acid or acetic acid, or an acidic salt. The titanium component can be conveniently dissolved in the acid or alkali metal silicate solution and coprecipitated with the silica. The titanium compound can be incorporated in the acid in any form in which it subsequently will be incorporated in the silica gel formed on combination of the silicate and the acid and from which form it is subsequently convertible to titanium oxide on calcination. Suitable titanium compounds include, but are not limited to, halides such as TiCl$_3$ and TiCl$_4$, nitrates, sulfates, oxalates and alkyl titanates. In instances where carbon dioxide is used as the acid, the titanium can be incorporated into the alkali metal silicate itself. When using acidic salts, the titanium compound can be incorporated in the alkali metal silicate and in such instances, convenient titanium compounds are water soluble materials which do not precipitate the silicate, i.e., are those convertible to titanium oxide on calcination such as, for example, various titanium oxalates, such as K$_2$TiO(C$_2$O$_4$)$_2$.H$_2$O, (NH$_4$)$_2$TiO(C$_2$O$_4$)$_2$.H$_2$O and Ti$_2$(C$_2$O$_4$)$_3$.H$_2$O. As used herein, the term "silica-titania" support includes supports formed by any of these coprecipitation or cogel processes, or other processes by which titania and silica are both incorporated into the support.

In another embodiment, titanium is incorporated by surface-modifying a supported chromium catalyst. As used herein, the term "titanium surface-modified supported chromium catalyst" is meant to include any supported chromium catalyst that is further modified to include titanium; see, e.g., C. E. Marsden, *Plastics, Rubber and Composites Processing and Applications*, 21 (1994), 193-200. For example, it is known to modify supported chromium catalysts by slurrying the chromium catalyst in a hydrocarbon and contacting the slurry with a titanium alkoxide, Ti(OR)$_4$, and heating to form a dried, titanium surface-modified supported chromium catalyst. The alkyl group R of the alkoxide can be a C$_3$ to C$_8$ linear or branched alkyl group; a particular example of a suitable titanium alkoxide is titanium tetraisopropoxide.

The titanium compound preferably is generally present in an amount of from a lower limit of 0.5% or 1% or 2% by weight to an upper limit of 12% or 10% or 8% or 6% or 5% or 4% or 3% by weight, with ranges from any lower limit to any upper limit being contemplated. It is preferred that the amount of titanium be in the range of 1.0 wt. % to 5.0 wt. %, more preferably 1.5 wt. % to 4.5 wt. % (3.0±1.5 wt. %).

In an embodiment for resin to make drums, the even more preferable range is 2.5±0.5 wt. %. In an embodiment for HIC containers, and utility conduit, the even more preferable ranges is 3.5±0.5 wt. %.

The chromium compound can be incorporated in any convenient method known in the art. For example, a chromium compound and optionally a titanium compound, is dissolved in an acidic material or the silicate and thus coprecipitated with the silica. A suitable chromium compound for this method is chromic sulfate. Another method to incorporate a chromium compound into the catalyst system is to use a hydrocarbon solution of a chromium compound convertible to chromium oxide to impregnate the support after it is spray dried or azeotrope dried (i.e., a xerogel). Exemplary of such materials are t-butyl chromate, chromium acetylacetonate, and the like. Suitable solvents include, but are not limited to, pentane, hexane, benzene, and the like. Alternatively, an aqueous solution of a chromium compound simply can be physically mixed with the support. These types of catalyst systems are disclosed in U.S. Pat. No. 3,887,494.

Chromium can be present in the catalyst an amount from a lower limit of 0.1 or 0.5 or 0.8 or 1.0% by weight to an upper limit of 10% or 8% or 5% or 4% or 3% or 2% by weight, with ranges from any lower limit to any upper limit being contemplated. The preferred amount of chromium is about 1.0±0.5 wt. %, particularly when the process utilizes the slurry loop platform, discussed more fully below.

Other inorganic oxides may optionally be present, such as thoria, zirconia, boron oxide, alumina, and the like, but in a preferred embodiment, with regard to inorganic oxides other than that of the silica support, only the oxides of chromium and titanium are present to the extent provided by ordinary purification techniques. In another embodiment, additional metals are permissible provided they do not materially affect the basic characteristics of the catalyst or the activation procedure according to the present invention.

The weight percent of the aforementioned metals are based on the weight of the support, e.g, silica in the preferred embodiment.

In an embodiment described herein, the chromium and titanium-based supported catalyst to be treated by the method described herein has hydrocarbon residues deposited thereon. "Hydrocarbon residues" as used herein means any species or moiety containing hydrogen and carbon, which is present on the catalyst and/or support. Without limitation, such hydrocarbon residues may be present on the catalyst and/or support as a result of having been deposited during the manufacture of the catalyst or support, such as organic solvent residues or by the deposition of one or more of chromium, titanium, zirconium, aluminum, and boron on the support from an organic solution (e.g., chromium acetate), such as described in the previously mentioned U.S. Pat. No. 5,895,770. Hydrocarbon residues may also be present in supported catalysts comprising chromium and/or titanium made by gel processes such as in the cogel and tergel catalysts described in the previously mentioned EP patents. The present invention is applicable to any chromium and titanium-based supported catalyst having hydrocarbon residues thereon or therein, however made.

Chromium and titanium and optional species, if present, may have been deposited from solution and hydrocarbon residues are present at least in part as a result of this deposition process (e.g., hydrocarbon residues may be from the solvent or metal counter ion). Hydrocarbon residues may also be present as a result of the manufacture or processing of the support.

As used herein, the terms "chromium and titanium-based supported catalyst" is intended to distinguish the catalyst according to the present invention from a "chromium-based catalyst" which does not contain titanium and will refer to the aforementioned embodiments wherein the supported catalyst comprises chromium and titanium and optionally at least one of zirconium, aluminum, or boron.

In a preferred embodiment of the invention, the process concerns the activation of catalyst, where the catalyst is a chromium and titanium-based supported catalyst supported on silica or silica/alumina, optionally further comprising zirconium, boron, aluminum, and mixtures thereof, wherein the chromium and titanium and optional species, if present, have been deposited from solution prior to the treatment according to the present invention, and hydrocarbon residues are present at least in part as a result of this deposition process (e.g., it may be from the solvent or metal counter ion). Hydrocarbon residues may also be present as a result of the manufacture or processing of the support.

The chromium and titanium-based supported catalyst according to the present invention, optionally with one or more of zirconium, boron, and aluminum, is then placed in an activator to be treated by the process according to the present invention.

The invention may be practiced using any known method for bringing gases and solids into contact with each other, such as in a static bed or a fluidizing bed. Advantageously the activator will be a fluidized bed.

The activator may be heated by, for instance, by internal reactor heating rods, by an external source of heat applied to the reactor walls such as electrical heat, or by heat of combustion, by provision for heating the gas entering the reactor via one or more gas inlet valves, or by a combination of such heating sources, all of which can be measured and controlled by means per se well known.

It should be noted that, as used herein, or "activator temperature" is typically measured at or very close to the catalyst bed and thus, as would be understood by one of skill in the art, "activator temperature" is taken as surrogate for the temperature of the catalyst.

In a previously known process for the activation of a supported chromium and titanium catalyst for the polymerization of polyolefins, the catalyst is activated by oxygen gas, typically provided in the form of dry (anhydrous) air, at elevated temperatures. The temperature is ramped up from room temperature to about 425° C. to about 870° C. (800-1600° F.) using, for instance, a combination of activator heating rods and gas inlet preheaters. However, during this air activation process a very large temperature spike or exotherm is observed early during ramping, well below the point at which the activator temperature is at about 370° C. (700° F.), which rapidly brings the activator temperature to above 590° C. (1100° F.) for a few minutes. The activator temperature then subsides until it achieves a temperature consistent with the temperature ramp of the activation procedure.

According to an embodiment of the present invention, similar to the above procedure but using dry (anhydrous) nitrogen gas, argon, or other inert gas, the temperature of the fluidized bed activator is ramped from room temperature to a preselected temperature between about 370-540° C. (700-1000° F.), preferably 370-450° C. (700-850° F.), more preferably 370-425° C. (700-800° F.), still more preferably 370-400° C. (700-750° F.), for a hold period, preferably at least for a time sufficient for most if not all the water, along with a substantial portion of the hydrocarbon residues, to be driven off from the supported catalyst. This temperature hold under nitrogen or other inert environment is preferably held for one minute to up to 6 hours.

The catalyst used in the process according to the present invention is a chromium and titanium-based supported catalyst activated in an activator at about 370-540° C. (700-1000° F.), preferably 370-450° C. (700-850° F.), more preferably 370-425° C. (700-800° F.), still more preferably 370 to 400° C. (700-750° F.) under an inert atmosphere, followed by the introduction of an oxidant, preferably in the form of air, and controlling the activator temperature so that the temperature of the catalyst activator does not exceed 510° C. (950° F.), preferably no higher than about 480° C. (900° F.), and yet still more preferably no higher than about 450° C. (850° F.), most preferably no higher than about 425° C. (800° F.).

In another embodiment the activator temperature is controlled by the rate of addition of oxygen and by the temperature of the gas entering the activator. Thus, the present invention also includes a process for polymerizing ethylene including treating a chromium and titanium-containing supported catalyst at about 370-400° C. (700-750° F.) under an inert atmosphere which may be at least partially preheated to a temperature higher or lower than the activator temperature, followed by the controlled introduction of an oxidant, preferably in the form of air, which has been preheated to a temperature no greater than about 400° C. (750° F.), most preferably by air which has been preheated to about 200° C. (400° F.) or less, while controlling the temperature spike or exotherm so that the temperature of the catalyst activator does not exceed 510° C. (950° F.), preferably no higher than about 480° C. (900° F.), and yet still more preferably no higher than about 450° C. (850° F.), most preferably no higher than about 425° C. (800° F.).

In another embodiment of the invention, in addition to the temperature hold period described above, additional hold periods at temperatures lower than 370° C. (700° F.) are contemplated. Thus in one embodiment the activator temperature is ramped up from room temperature to about 205° C.±25° C. (400° F.±45° F.) at about 220° C./hr (400° F./hr) and held at this temperature under a nitrogen atmosphere for a period of one minute to up to about 6 hours, or even more, followed by a temperature ramp up to a preselected temperature between about 370-540° C. (700-1000° F.), preferably 370-450° C. (700-850° F.), more preferably 370-425° C. (700-800° F.), still more preferably 370 to 400° C. (700-750° F.), at a rate of about 200° C./hr (350° F./hr), while still under an inert atmosphere. This temperature and inert atmosphere is then held constant for a period of from one minute up to about 6 hours. Even greater hold periods are possible, however the benefits, if any, are generally offset by the greater cost.

According to an embodiment of the invention the activator temperature of between about 370-540° C. (700-1000° F.), preferably 370-450° C. (700-850° F.), more preferably 370-425° C. (700-800° F.), still more preferably 370 to 400° C. (700-750° F.), is held, as mentioned, for a period before continuing the temperature ramping and/or changing the treatment gas from entirely nitrogen (or other inert gas) to at least partial oxygen, as further described below.

The temperature hold periods described above may be selected to be any time within the time ranges specified. Thus, the present invention contemplates embodiments wherein the temperature is held at a preselected temperature between about 370-540° C. (700-1000° F.), preferably 370-450° C. (700-850° F.), more preferably 370-425° C. (700-800° F.), still more preferably 370 to 400° C. (700-750° F.), for any period between 1 minute to up to six hours or more, such as for a period of one hour, a period of from one hour for up to two hours, a period of from two hours for up to three hours, a period of from three hours for up to four hours, a period of from four hours for up to five hours, a period of from one hour to five hours, or any period of time within the aforementioned ranges, prior to changing the temperature conditions of the activator, and/or prior to changing the atmosphere of the activator, as described in more detail herein.

In another embodiment, the activator includes both activator heater rods and gas inlet preheaters, and both are used during ramping and during the temperature hold periods. In an embodiment, however, the temperatures of the activator and the gas inlet preheaters are not identical. Thus, in one preferred embodiment during the hold period the one or more gas inlet preheaters heat the entering inert gas to a temperature of about 450° C. (850° C.) while the activator heating rods are allowed to adjust to a temperature which will allow the activator temperature to be maintained at the selected temperature within the range of 370-540° C. (700-1000° F.), preferably 370-450° C. (700-850° F.), more preferably 370-425° C. (700-800° F.), still more preferably 370 to 400° C. (700-750° F.).

In another embodiment, after a certain period of time at the hold temperature of 370-540° C. (700-1000° F.), preferably 370-450° C. (700-850° F.), more preferably 370-425° C. (700-800° F.), still more preferably 370 to 400° C. (700-750° F.), and prior to a change over to a partial oxidizing atmosphere, the temperature of the gas inlet preheater(s) is lowered to a temperature below the activator temperature. Thus, in one embodiment the temperature of the gas inlet preheater(s) is lowered to about 400° C. or less or in yet another embodiment it is lowered still further to as low as about 200° C. or less. In these embodiments wherein the entering gas effectively provides a coolant to the activator, the activator heating rods (or external heating source) must provide additional heat to maintain the temperature of the activator constant.

The nitrogen (or inert gas) treatment may occur to an even higher temperature, however (again without wishing to be bound by theory) it is believed that above about 540° C. (1000° F.) the supported chromium and titanium catalyst may be converted partially or wholly into a form ("green batch") which is less amenable to a subsequent treatment with oxygen. A green batch may also be observed under conditions where the oxygen is present at a concentration of less than about 20% by volume, i.e., less oxygen than is normally present in air. Thus temperatures of above about 540° C. should be avoided during the treatment under pure nitrogen or other inert gaseous treatment and during conditions where pure nitrogen is mixed with air.

Blow molding applications include IBCs, HICs, and drums. Extrusion resins applications include utility conduit, extruded pipe (generally larger than utility conduit), thick sheeting, and thin sheeting. Each of these applications may have different, sometimes overlapping catalyst activation temperature and physical properties.

Drum and IBC blow molding and extruded pipe catalysts are preferably activated at 538-705° C. (1000-1300° F.). The extruded pipe catalyst is more preferably activated at 548-638° C. (1020-1180° F.) and the resin preferably has a density of 0.948-0.958 g/cm$^3$ (ASTM D-4883), and an $I_2$ of about 0.15-0.45 g/10 min (ASTM D-1238).

The blow molding drum and IBC resin preferably has a density of 0.940-0.958 g/cm$^3$ (ASTM D1505) and an $I_{22}$ of about 2-12 g/10 min (ASTM D-1238-65T, Condition F). The blow molding drum resins preferably have 0.950-0.957 g/cm$^3$ (ASTM D-1505) and $I_{22}$ of about 2-12 g/10 min (ASTM D-1238-65T, Condition F). The blow molding IBC resins preferably have 0.940-0.948 g/cm$^3$ density (ASTM D-1505) and an $I_{22}$ of about 3-10 g/10 min (ASTM D-1238-65T, Condition F).

The conduit resin catalyst preferably has catalyst activation at about 605-695° C. (1120-1280° F.) and the resin preferably has a density of about 0.942-0.952 g/cm$^3$ (ASTM D-4883) and $I_2$ of about 0.15-0.45 g/10 min (ASTM D-1238). More preferably the resin exhibits ESCR greater than 96 hours by ASTM D-1693 Condition B, F20, 10% Igepal.

The sheet extrusion and HIC catalysts preferably have the catalyst activation at about 538-871° C. (1000-1600° F.). Catalysts used to make resins for thick sheet extrusion and HIC containers are more preferably have their catalyst activated at 594-816° C. (1100-1500° F.). The thick sheet resins are preferably of about 0.945-0.958 g/cm$^3$ density by ASTM D-1505, and preferably have an $I_2$ of about 3-20 g/10 min by ASTM D-1238-65T, Condition F). The blow molding HIC resins have densities preferably about 0.940-0.960 g/cm$^3$ by ASTM D-4883 but preferably have much lower $I_2$ values of about 0.1-0.5 g/10 min by ASTM D-1238.

Thin sheet extrusion resins are preferably made using a catalyst activated at about 594-871° C. (1100-1600° F.) and have preferable densities of about 0.945-0.965 g/cm$^3$ by ASTM D-4883 and preferably $I_2$ of about 0.1-1.0 g/10 min by ASTM D-1238.

In two embodiments, activation may then be completed by contacting the catalyst in the activator with an oxidizing atmosphere, preferably an atmosphere consisting essentially of air. The final temperature of the activator under an oxidizing atmosphere, preferably an atmosphere consisting essentially of air, is 548-638° C. (1020-1180° F.) in a first embodiment and 605-695° C. (1120-1280° F.) in a second embodiment, for a period of from 1 minute to 10 hours, preferably 3.5 to 8 hours, more preferably 4 to 8 hours and yet still more preferably 6 hours. While a treatment at this temperature for more than 6 hours is possible, the advantages, if any, are typically offset by the cost.

After the aforementioned treatment under nitrogen according to the present invention, oxidant may be introduced into the activator, preferably oxygen gas, and more preferably air. It is preferred that the temperature of the activator be between about 370-425° C. (700-800° F.), preferably about 370 to 400° C. (700-750° F.), most preferably at about 400° C. (750° F.).

Preferably oxygen is introduced into the activator by adding a small amount of air to the gas inlet mixture. In an embodiment of the invention the addition of air is controlled so that the observed temperature spike or exotherm does not exceed 590° C. (1100° F.), more preferably 480° C. (900° F.), even more preferably 450° C. (850° F.) and yet still more preferably the temperature spike or exotherm does not exceed 425° C. (800° F.).

In a preferred embodiment, a 370-400° C. (700-750° F.) nitrogen atmosphere temperature hold is maintained for about 3.5 hours and then air is introduced in with the nitrogen flow so that the gas entering through the gas inlet(s) consists of about 2.8% oxygen. This atmosphere is maintained for about 1.5 hours, while controlling the activator temperature so that the observed temperature spike does not exceed 590° C. (1100° F.), more preferably 480° C. (900° F.), even more preferably 450° C. (850° F.) and yet still more preferably does not exceed 425° C. (800° F.).

The total gas flow rate preferably is maintained at a constant rate during the change over from nitrogen to oxygen, so that the increase in oxygen to the desired partial pressure is accompanied by a decrease in the nitrogen partial pressure.

As previously described, at some point prior to the introduction of a partial atmosphere of oxygen, in a preferred embodiment the gas entering the activator via the inlet valve(s) effectively provides a coolant to the activator by lowering the temperature of the inlet preheaters to as low as 400° C. or less or even as low as about 200° C. or less. In a preferred embodiment this lowered temperature of the preheater is maintained during the introduction of a partial air environment.

Even after the treatment for a prolonged period under nitrogen, a temperature spike is observed when even a small amount of oxygen is first admitted to the reactor. However, in accordance with the present invention the observed temperature spike may be controlled to no greater than 480° C. (900° F.), more preferably no greater than 450° C. (850° F.) and yet still more preferably no greater than 425° C. (800° F.).

After the temperature spike subsides and the reactor temperature approaches the preselected temperature within the range of 370-540° C. (700-1000° F.), preferably 370-450° C. (700-850° F.), more preferably 370-425° C. (700-800° F.), still more preferably 370 to 400° C. (700-750° F.), the atmosphere may be converted to 100% air and the temperature may be ramped up to the final treatment temperature.

In another embodiment, activation may then be completed, preferably by contacting the catalyst in the reactor with an oxidizing atmosphere, preferably an atmosphere consisting essentially of air. It is more preferred that the final temperature of the reactor under an atmosphere consisting essentially of air be at least about 425° C. (800° F.), more preferably about 540° C. (1000° F.), and still more preferably 590° C. (1100° F.) up to about 870° C. (1600° F.). In a preferred embodiment the temperature is ramped up to the final hold temperature at about 65° C./hr (150° F./hr). In a preferred embodiment, the final temperature may be held for a period of time of from 1 minute up to about 6 hours or even longer. More preferably the final temperature hold the temperature of between 425° C. (800° F.) and 870° C. (1600° F.) is between 4 hours and 6 hours.

The final activation or activation hold temperature is a key to the extrusion pipe, blow molding, and utility conduit resins according to the present invention. A lower final hold temperature yields a polymer having a better ESCR but its activity will be too low for economical polymerization reactor operation, while a higher final hold temperature yields a more easily produced HDPE but without adequate ESCR.

The thus-activated supported chromium and titanium-based catalyst, optionally containing one or more of zirconium, aluminum, and boron is then preferably cooled to about 150-315° C. (300-600° F.), purged with nitrogen while cooling to room temperature and then used as desired.

The amount of chromium on said support is in the range of about 0.5 to about 5 weight percent, preferably about 1 weight percent, and the amount of titanium is about 1-6 weight percent, preferably about 3.5 weight percent. The weight percents of the metals are based on the weight of the support.

The chromium and titanium catalyst may further comprise at least one of zirconium, aluminum, or boron. In a preferred embodiment the catalyst is a silica-supported thermally-activated chromium and titanium catalyst.

In a preferred embodiment the chromium and titanium-based catalyst does not contain added metals, such as aluminum, boron, and zirconium (other than what is provided by the support, e.g., silica or silica/alumina). In another embodiment, additional metals such as aluminum are permissible. In yet another, additional metals are permissible provided they do not materially affect the basic characteristics of the catalyst or the activation procedure according to the present invention.

Catalysts as described above which are useful in the present invention are commercially available, such as from The PQ Corporation, W.R. Grace and Company, and Ineos Silicas Americas, LLC.

Appropriate supported titanium-chromium catalysts are commercially available or they can be made by one of ordinary skill in the art. Examples of suitable, commercially available titanium-chromium catalysts include titanium-surface modified chromium catalysts from PQ Corporation, Philadelphia, Pa., such as C-23307, C-25305, C-25345, C-23305, and C-25307.

The ethylene used should be polymerization grade ethylene. The other olefins that can be used are alpha-olefins having from 3 to 10 carbon atoms. Numerous acceptable alpha-olefins will be apparent to one of ordinary skill in the art in possession of the present disclosure. The preferred olefins to be copolymerized are 1-butene, 1-hexene, and 1-octene.

The extrusion pipe resin according to the present invention preferably has a density of about 0.948-0.958 g/cm$^3$ (ASTM D-4883) and a preferred range of $I_2$ of 0.15-0.45 g/10 min (ASTM D-1238). The conduit resin according to the present invention preferably has a density of about 0.942-0.952 g/cm$^3$ (ASTM D-4883) and a preferred range of $I_2$ of 0.15-0.45 g/10 min (ASTM D-1238). The blow molding, HIC container, and sheet extrusion resin preferably has a density of 0.944-0.958 (ASTM D-1505) and an $I_2$ of about 2-12 g/10 min (ASTM D-1238-65T, Condition F). These characteristics may be readily achieved by one of ordinary skill in the art in possession of the present disclosure.

Reference will be made to the following specific examples, which are not intended to be limiting.

EXAMPLES 1-3

Commercial silica-supported chromium and titanium-based catalysts, PQ C-25307™ and C-25035™, available from PQ Corporation, Philadelphia, Pa. were activated in the following manner.

The catalyst is placed in a fluidizing bed activator of the type well-known in the art. The activator comprises heating rods to heat the catalyst bed and gas inlets with preheaters. The catalyst is fluidized with dry $N_2$ and the temperature of the activator/catalyst bed is ramped up at about 222° C./hr (400° F./hr) to 205° C. (400° F.). It is held at this temperature under a nitrogen flow of about 126 CFM (cubic feet per minute) for 4 hours and then ramped at about 195° C./hr (350° F./hr) to hold at about 400° C. (750° F.) under a nitrogen flow of about 144 CFM. The catalyst is held in the activator under these conditions for about 3.5 hours. The gas inlet preheaters are set to 450° C. (850° F.) during the period that the activator temperature is held at 400° C. (750° F.) under nitrogen, and shortly before the introduction of the 20 CFM of air, the gas inlet preheaters are lowered to about 200° C. (400° F.).

Then a controlled amount of oxidant is introduced, in the form of dry air at a rate of 20 CFM, with a decrease in the nitrogen flow to approximately 122 CFM, so that the amount of oxygen in the activator is at a concentration of about 2.8% by volume, while maintaining the activator at about 400° C. (750° F.). A temperature spike to about 425° C. (800° F.) is observed in the activator shortly after the partial oxygen environment is introduced, but the activator temperature approaches 400° C. (750° F.) within about 90 minutes. The gas inlet preheaters remain set at about 200° C. (400° F.) during this period.

The atmosphere is then switched to 100% dry air and the temperature is ramped using both the activator probe heaters and the gas inlet preheaters, at about 83° C./hr (150° F./hr) to either 590° C. (1100° F.) or 650° C. (1200° F.) and held for 6 hours, to complete activation.

The catalyst is then cooled to about 150-205° C. (300-400° F.) under an atmosphere of air and then fluidized with nitrogen and allowed to come to room temperature.

The thus-activated catalyst is used in a slurry loop polymerization process to produce HDPE resin. The resin from the first PQ C-25307 catalyst has a Melt Index (190/2.16 ("$I_2$")) of 0.30 g/10 min (ASTM D-1238), density of 0.946 g/cm$^3$ (ASTM D-4883), and ESCR>96 hours (ASTM D-1693, Condition B, F20, 10% Igepal). This resin is particularly suitable for telecommunications conduit pipe (although the aforementioned values should not be interpreted as specifications therefor).

Under the conditions previously described, using in this case 1-hexene as the comonomer, another HDPE resin is produced from a second sample of the PQ C-25307 catalyst.

The second resin has a nominal $I_2$ value of 0.25 g/10 min, a density of 0.953 g/cm$^3$ (ASTM D-4883), and ESCR>24 hours (NCTL at 15% Yield Stress). This resin is particularly suitable for large diameter highway drainage pipe made by extrusion (although the aforementioned values should not be interpreted as specifications therefor).

The resin from the PQ C-25305 catalyst has a nominal $I_{22}$ value (which may be referred to as Flow Rate 190/21.6 or HLMI) of 5.8 g/10 min (ASTM D-1238-65T, Condition F), a nominal density of 0.954 g/cm$^3$ (ASTM D-1505). These values are not intended to be performance specifications but represent typical values. This resin is particularly suitable for 30- and 55-gallon drums, IBCs, and other large parts made by blow molding and/or sheet extrusion/thermoforming operations.

EXAMPLE 4

101151 In the same manner as Examples 1-3, PQ C-23307 was activated in with N$_2$/air activation, then used to produce blow molding resin with nominal $I_2$ of 0.4 g/10 min and density 0.953 g/cm$^3$. Uniloy tab swell was nominally 6.15 inches. Processing properties were good and bent strip ESCR was 32 hrs.

Trade names used herein are indicated by a ™ symbol, indicating that the names may be protected by certain trademark rights. Some such names may also be registered trademarks in various jurisdictions.

All patents and patent applications, test procedures (such as ASTM methods), and other documents cited herein are fully incorporated by reference to the extent such disclosure is not inconsistent with this invention and for all jurisdictions in which such incorporation is permitted.

All temperatures were measured using ° F. scale and thus some additional tolerance should be allowed for rounding during conversion of these temperatures to ° C. scale, in addition to the ordinary tolerance provided for the term "about".

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

Thus many variations of the following embodiments will suggest themselves to those skilled in this art in light of the above detailed description:

a process for producing a resin suitable for use as extruded pipe, especially large diameter extruded pipe suitable for highway drainage pipe, and for producing a resin suitable for sheet extrusion and/or blow molding, said process comprising polymerizing ethylene or copolymerizing ethylene and an alpha-olefin comonomer comprising 3 to 10 carbon atoms, in the presence of a chromium and titanium-based catalyst activated by: (a) contacting said catalyst in an activator at a temperature of between about 370-540° C. (700-1000° F.), preferably 370-450° C. (700-850° F.), more preferably 370-425° C. (700-800° F.), still more preferably 370 to 400° C. (700-750° F.) with an atmosphere consisting essentially of an inert gas; and then (b) introducing an oxidant, preferably air, into said activator so that the temperature of said activator does not exceed about 510° C. (950° F.), preferably does not exceed about 480° C. (900° F.), and yet still more preferably does not exceed 450° C. (850° F.), most preferably does not exceed about 425° C. (800° F.); and then (c) completing the activation of said catalyst in an activator at a temperature of about 548-638° F. (1020-1180° F.) for extruded pipe and about 605-695° C. (1120(1280° F.) for utility conduit, for a period of from 1 minute to 10 hours, preferably 3.5 to 8 hours, more preferably 4 to 7 hours and yet still more preferably 6 hours, under an oxidizing atmosphere, preferably an atmosphere consisting essentially of air;

the aforementioned process wherein step (c) further comprises contacting said catalyst in said activator with an atmosphere consisting essentially of air, preferably for at least one minute, more preferably for a period of from 1 minute to about 6 hours;

any of the above wherein step (c) further comprises contacting said catalyst in said activator with an atmosphere consisting essentially of air between about 425° C. (800° F.) and about 870° C. (1600° F.);

any of the above wherein the temperature in (a) does not exceed about 400° C. (750° F.), and the temperature in (b) does not exceed about 425° C. (800° F.);

any of the above wherein said oxidant is air;

and any of the above wherein both (a) and (b) include a step wherein the gases introduced are preheated to a temperature of about 400° C. or less;

any of the above wherein both (a) and (b) include a step wherein the gases introduced is preheated to a temperature of about 200° C. or less;

any of the above wherein said supported catalyst further comprises a metal selected from the group consisting of zirconium, aluminum, boron, and mixtures thereof;

any of the above wherein said supported catalyst comprises chromium and titanium supported on silica; and any of the above wherein said supported catalyst comprises chromium and titanium supported on silica-alumina;

any of the above wherein (b) includes controlling the temperature by controlling the amount of oxidant input into the activator;

any of the above wherein (b) includes controlling the temperature by controlling the temperature of the air input into the activator;

any of the above wherein (b) includes controlling the temperature by controlling the amount of the air input and controlling the temperature of the air input;

any of the above wherein (a) includes a step wherein the inert gas introduced is preheated to a temperature of about 450° C. (850° F.) and then a step wherein said inert gas is preheated to a temperature of no more than 200° C. (400° F.);

any of the above wherein said catalyst further comprises hydrocarbon residues present on the support as a result of the deposition of chromium and titanium from solution;

also, including a supported chromium and titanium-based catalyst, optionally further comprising at least one of aluminum, boron, and zirconium, activated by the process according to any of the embodiments set forth above;

also, including a polyethylene comprising the residue of a catalyst activated according to any of the process embodiments set forth above, or a polyethylene comprising the residue of the chromium and titanium-based catalyst characterized above;

also, including an article comprising polyethylene characterized above;

also, resins suitable for use as extruded pipe suitable for highway drainage and for use as utility conduit made by the process and process variations described above, which may also be characterized as a resin comprising the residue of a chromium and titanium-based catalyst activated by: (a) contacting said catalyst at a temperature of between about 370-540° C. (700-1000° F.), preferably 370-450° C. (700-850° F.), more preferably 370-425° C. (700-800° F.), still more preferably 370 to 400° C. (700-750° F.) with an atmosphere consisting essentially of an inert gas; and then (b) introducing an oxidant, preferably air, so that the temperature does not exceed about 510° C. (950° F.), preferably does not exceed about 480° C. (900° F.), and yet still more preferably does not exceed 450° C. (850° F.), most preferably does not exceed about 425° C. (800° F.); and then (c) completing the activation of said catalyst at a temperature of about 548-638° C. (1020-1180° F.) for extruded pipe and about 605-695° C. (1120-1280° F.) for utility conduit, preferably for a period of from 1 minute to 10 hours, preferably 3.5 to 8 hours, more preferably 4 to 7 hours and yet still more preferably 6 hours, under an oxidizing atmosphere, preferably an atmosphere consisting essentially of air;

also, an article made by extruding the composition previously described above, particularly in the embodiments, the article being characterized by having a hollow core;

also, to the use of the extruded composition to carry or house fluids (liquids and gases);

and more particularly preferred embodiments of the sheet extrusion process and/or the blow molding process wherein the temperature of said activator in (a) does not exceed about 450° C. (850° F.); wherein the temperature of said activator in (c) does not exceed about 450° C. (850° F.); wherein the temperature of said activator in (a) does not exceed about 400° C. (750° F.) and the temperature of said activator in (b) does not exceed about 425° C. (800° F.); wherein (c) further comprises completing the activation at said temperature and under said oxidizing atmosphere for a period of from 1 minute to 10 hours; wherein said period in (c) is from 4 to 7 hours; wherein said oxidizing atmosphere in (c) is an atmosphere consisting essentially of air; wherein said oxidizing atmosphere in (c) is an atmosphere consisting essentially of air; wherein said resin has a density range of about 0.944-0.958 g/cm$^3$ according to ASTM D-1505 and a $I_{22}$ in the range of about 2-12 g/10 min according to ASTM D-1238-65T, Condition F;

also, more preferably one or both of the following properties: wherein $I_{22}$ is in the range of about 3-8 g/10 min according to ASTM D-1238-65T, Condition F and/or wherein the density is in the range of about 0.950 to 0.957 g/cm$^3$;

wherein said catalyst consists essentially of chromium and titanium on a silica support;

wherein said catalyst comprises about 1.0±0.5 wt. % chromium and 1.0 to 5.0 wt. % titanium, supported on silica, the weight percents based on the weight of the silica support;

wherein said process occurs in a slurry loop reactor under slurry polymerization conditions;

a resin suitable for use in blow molding and/or sheet extrusion and having a density range of about 0.944-0.958 g/cm$^3$ according to ASTM D-1505 and a $I_{22}$ in the range of about 2-12 g/10 min, according to ASTM 1238-65T, Condition F, further characterized as comprising the residue of a chromium and titanium-based catalyst activated by: (a) contacting said catalyst in an activator at a temperature of between about 370-540° C. (700-1000° F.) with an atmosphere consisting essentially of an inert gas; and then (b) introducing an oxidant into said activator so that the temperature of said activator does not exceed about 510° C. (950° F.); and then (c) completing the activation of said catalyst in an activator at a temperature of about 548-638° C. (1020-1180° F.) under an oxidizing atmosphere;

and also more preferred embodiments wherein said resin has a density range of about 0.950-0.957 g/cm$^3$ according to ASTM D-1505 and/or an $I_{22}$ in the range of about 3-8 g/10 min according to ASTM D-1238-65T, Condition F;

wherein said resin is produced in a slurry polymerization reactor under slurry polymerization conditions;

a container suitable for holding industrial chemicals comprising the blow molding resin according to the invention, including preferred and more preferred embodiments in this paragraph; particularly wherein the container is at least 30 gallons by volume and also including as more preferred embodiments 55-gallon drums, and 100- and 300-gallon IBCs;

any of the foregoing container embodiments wherein said container is comprised of the resin according to the invention, particularly a polyethylene resin having a density of 0.950-0.957 g/cm$^3$ according to ASTM D-1505 and/or an $I_{22}$ in the range of about 3-8 g/10 min according to ASTM D-1238-65T, Condition F;

an article made by a process comprising sheet extrusion/ thermoforming a resin cording to the invention, especially wherein the article comprises resins as described in this paragraph;

an article made by a process comprising blow molding a resin according to the invention, especially wherein the article comprises resins as described in this paragraph;

a container suitable for holding industrial chemicals, said container made by a process comprising blow molding the resin according to the invention, particularly a resin as described in this paragraph;

an article comprising blow molding resin according to the invention, particularly a resin as described in this paragraph;

an article made by a process comprising sheet extruding a resin having a density range of about 0.944-0.958 g/cm³ (more preferably 0.950-0.957 g/cm³) according to ASTM D-1505 and a $I_{22}$ in the range of about 2-12 g/10 min (preferably 3-8 g/10 min) according to ASTM 1238-65T, Condition F, further characterized as comprising the residue of a chromium and titanium-based catalyst activated by; (a) contacting said catalyst in an activator at a temperature of between about 370-540° C. (700-1000° F.) with an atmosphere consisting essentially of an inert gas; and then (b) introducing an oxidant into said activator so that the temperature of said activator does not exceed about 510° C. (950° F.); and then (b) completing the activation of said catalyst in an activator at a temperature of about 548-638° C. (1020-1180° F.) under an oxidizing atmosphere; and also an article made by extruding the composition previously described in any of the embodiments, the article being characterized by having a hollow core, and also to the use of the extruded composition to carry or house material, particularly electrical wire, cable, optical fibers, and the like (which may be characterized as utilities or material carrying electromagnetic energy), but also fluids (liquids and gases).

We claim:

1. A catalyst activation process comprising:
   (a) heating a chromium and titanium-based supported catalyst having a hydrocarbon residue, in an inert atmosphere to about 370-540° C.;
   (b) introducing an oxidant to said catalyst in a controlled manner for a hold period sufficient to drive off the hydrocarbon residue wherein the addition of air is controlled so that the observed temperature spike or exotherm does not exceed 590° C.; and
   (c) oxidizing the catalyst at a temperature and for a time sufficient to activate the catalyst.

2. The process according to claim 1, wherein step (c) further comprises contacting said catalyst with an atmosphere consisting essentially of air.

3. The process according to claim 2, wherein step (c) further comprises contacting said catalyst with an atmosphere consisting essentially of air between about 425° C. (800° F.) and about 870° C. (1600° F.).

4. The process according to claim 1, wherein the temperature in (a) does not exceed about 400° C. (750° F.), and the temperature in (b) does not exceed about 425° C. (800° F.).

5. The process according to claim 1, wherein said oxidant is air.

6. The process according to claim 5, wherein both (a) and (b) include a step wherein the gases introduced are preheated to a temperature of about 400° C. or less.

7. The process according to claim 6, wherein both (a) and (b) include a step wherein the gases introduced are preheated to a temperature of about 200° C. or less.

8. The process according to claim 1, wherein said supported catalyst further comprises a metal selected from the group consisting of zirconium, aluminum, boron, and mixtures thereof.

9. The process according to claim 1, wherein said support is silica.

10. The process according to claim 1, wherein said support is silica-alumina.

11. The process according to claim 1, wherein (b) includes controlling the temperature by controlling the amount of oxidant introduced.

12. The process according to claim 5, wherein (b) includes controlling the temperature by controlling the temperature of the air introduced.

13. The process according to claim 5, wherein (b) includes controlling the temperature by controlling the amount of the air introduced and controlling the temperature of the air introduced.

14. The process according to claim 5, wherein in (a) the inert gas is preheated to a temperature of about 450° C. (850° F.).

15. The process of claim 5 wherein in (a) the inert gas is preheated to a temperature of no more than 200° C. (400° F.).

16. The process according to claim 1, wherein said catalyst further comprises hydrocarbon residues present on the support as a result of the deposition of chromium and titanium thereon from solution.

17. The process according to claim 1, wherein the temperature in (a) does not exceed about 450° C. (850° F.).

18. The process according to claim 1, wherein the temperature in (b) does not exceed about 450° C. (850° F.).

19. The process according to claim 1, wherein (c) further comprises completing the activation at said temperature and under said oxidizing atmosphere for a period of from 1 minute to 10 hours.

20. The process according to claim 19, wherein said period in (c) is from 4 to 8 hours.

21. The process according to claim 19, wherein said oxidizing atmosphere in (c) is an atmosphere consisting essentially of air.

22. The process according to claim 20, wherein said oxidizing atmosphere in (c) is an atmosphere consisting essentially of air.

23. The process according to claim 1, wherein said catalyst consists essentially of chromium and titanium on a silica support.

24. The process according to claim 1, wherein said catalyst comprises about 1.0±0.5 wt. % chromium and 1.0 to 5.0 wt. % titanium, supported on silica, the weight percents based on the weight of the silica support.

25. The process according to claim 1, wherein the oxidant is introduced to said catalyst in an atmosphere having an oxidant concentration of less than or equal to 2.8 volume percent.

26. The process according to claim 1, wherein the oxidant is introduced to said catalyst in a fluidized bed at a flow rate of less than or equal to 20 cubic feet per minute.

27. The process according to claim 4, wherein the oxidant is introduced to said catalyst in an atmosphere having an oxidant concentration of less than or equal to 2.8 volume percent.

28. The process according to claim 4, wherein the oxidant is introduced to said catalyst in a fluidized bed at a flow rate of less than or equal to 20 cubic feet per minute.

29. A catalyst activation process comprising:
   heating a chromium and titanium-based supported catalyst having a hydrocarbon residue in an inert atmosphere at a first temperature of about 370° C. to about 450° C.;
   introducing an oxidant to said catalyst for a hold period sufficient to drive off the hydrocarbon residue wherein introduction of said oxidant provides an increase in temperature from the first temperature to a second temperature that is less than or equal to 510° C.; and then oxidizing the catalyst at a third temperature of about 425° C. to about 870° C. for a time sufficient to activate the catalyst.

30. A catalyst activation process comprising:

heating a chromium and titanium-based supported catalyst having a hydrocarbon residue, in an inert atmosphere at a first temperature of about 370° C. to about 540° C. and hold for up to 6 hours;

cooling the inert atmosphere to a second temperature less than the first temperature;

introducing an oxidant to said catalyst for a hold period sufficient to drive off the hydrocarbon residue wherein the introduction of said oxidant provides an increase in temperature from the second temperature to a third temperature of about 510° C. or less; and increasing the oxidant concentration to oxidize the catalyst at a fourth temperature of about 425° C. to about 870° C. for a time sufficient to activate the catalyst, wherein the oxidant is added to the inert atmosphere at a rate to provide an oxidant concentration therein of less than or equal to 2.8 volume percent while maintaining the third temperature at about 590° C. or less.

* * * * *